US007686720B2

(12) United States Patent
Nikolai

(10) Patent No.: US 7,686,720 B2
(45) Date of Patent: Mar. 30, 2010

(54) PORTABLE POWER TAKE-OFF UNIT

(76) Inventor: Roger Nikolai, W-3170 Kington Rd., Loyal, WI (US) 54446

( * ) Notice: Subject to any disclaimer, the term of this patent is extended or adjusted under 35 U.S.C. 154(b) by 712 days.

(21) Appl. No.: 11/039,245

(22) Filed: Jan. 21, 2005

(65) Prior Publication Data

US 2006/0180100 A1 Aug. 17, 2006

(51) Int. Cl.
*F16H 7/12* (2006.01)

(52) U.S. Cl. ....................... 474/135; 474/133; 180/53.1

(58) Field of Classification Search ................. 123/1 R; 172/439; 180/53.1; 280/416.1, 417.1; 417/364; 474/101, 113, 118, 133, 135, 138; 56/16.9; 74/15.2, 16

See application file for complete search history.

(56) References Cited

U.S. PATENT DOCUMENTS 1,506,652 A * 8/1924 Maker ..................... 222/145.4
1,978,582 A * 10/1934 Jones ......................... 474/135
2,592,008 A * 4/1952 Cherek ...................... 180/53.1
2,689,620 A * 9/1954 Hainke ...................... 180/19.1
3,783,592 A * 1/1974 Schraut ...................... 56/13.3
3,817,413 A 6/1974 Ham
3,883,020 A 5/1975 Dehn
4,173,951 A * 11/1979 Ishihara ......................... 123/2
4,593,855 A * 6/1986 Forsyth ....................... 239/74
5,201,638 A * 4/1993 Bieri .......................... 417/234
5,690,182 A 11/1997 Ward
5,907,970 A * 6/1999 Havlovick et al. ............. 74/16
6,134,494 A 10/2000 Stelzle et al.
6,148,928 A 11/2000 Spears
6,481,948 B2 11/2002 Spears

* cited by examiner

*Primary Examiner*—Robert A Siconolfi
*Assistant Examiner*—Stephen Bowes
(74) *Attorney, Agent, or Firm*—Theresa M. Seal

(57) ABSTRACT

A portable power take-off unit for mounting to and dismounting from the rear of a vehicle, such as a pickup truck, providing mechanical operational power to construction and farm implements and machinery includes an engine for driving a belt and pulley assembly that drives a chain and sprocket assembly that, in turn, drives a power take-off shaft at selectable high or low speeds. An elongated drive shaft from the machinery is connected to the power take-off shaft for connection to the implement or machinery so that power can be provided thereto. The power take-off unit includes a hydraulic system, comprising a pump, reservoir, couplers, and hoses, for controlling the operation of the machinery, and a manually operable engagement lever for engaging and disengaging the belt and pulley system thereby controlling the engagement and disengagement of the power take-off shaft.

27 Claims, 6 Drawing Sheets

PORTABLE POWER TAKE-OFF UNIT

FIELD OF THE INVENTION

The present invention pertains to power take-off assemblies, and more particularly pertains to a portable power take-off unit that can be mounted to the rear of a pickup truck for operating a range of low power PTO driven construction and farm equipment and machinery.

BACKGROUND OF THE INVENTION

Many types of work vehicles utilize what is referred to as a power take-off (PTO) shaft for the operation of equipment and implements that are attached to or towed behind the work vehicles. Agricultural vehicles such as the range of tractors available for use by farmers often employ power take-off shafts. The power take-off shaft provides for the power linkage and the transmission of mechanical power from the tractor's engine to the attached implement or piece of equipment. The power take-off shaft provides operational power for the implement, and this can include turning or rotating blades of the implement or powering the conveyor belt or system of the implement. Among the common pieces of equipment or machinery that can be driven from the power take-off are balers, mowers, grinders, augers, grinder mixers, manure pumps, forage (chopper) boxes, power boxes, hay rakes, and various types of wagons. In addition, some types of equipment and machinery are hydraulically operated, and the use of the power take-off shaft can be used to supply the power for their hydraulic operation. Such machinery includes, for example, hydraulic dump wagons and trailers; implements having discs that must be raised and lowered for transport; and wood splitters that employ hydraulic cylinders for running a blade or cutter.

In many cases the implement or machinery must be removed or hauled from the field by a vehicle, such as a pickup truck, and then unhooked from the pickup truck and hooked to the tractor—with the power take-off—for unloading the contents of the implement or undertaking further processing at feed mills or fertilizer plants. In addition, tractors are specialized types of vehicles, and are not conducive to traveling on regular roads and highways, let alone towing or hauling farm implements and machinery on such roads and highways. Yet such towing or hauling loads or produce is common, and it is desirable to have a power take-off assembly available for unloading the contents when the destination is reached (which can be a field on another part of the farm or feed or grain storage silos). Thus, it is desirable to have a power take-off unit available that is mounted to or operated from vehicles other than tractors. Moreover, it is desirable to have a portable power take-off unit for supplying mechanical power to non-powered construction or farm implements and machinery that are located at the work site or field and remote from a power source. Thus, the prior art discloses a number of power take-off systems and assemblies.

For example, the Ham patent (U.S. Pat. No. 3,817,413) discloses a demountable attachment for a load-carrying vehicle that includes a demountable body having wheels that roll along longitudinal members on the vehicle chassis for loading and unloading the body. The body also includes retractable legs that support the body when it's dismounted from the vehicle.

The Dehn patent (U.S. Pat. No. 3,883,020) discloses a framework that can be removably mounted onto the bed of a pickup truck and which includes detachable and retractable legs that facilitate the loading of the framework onto the pickup truck and the freestanding support of the framework when unloaded from the truck.

The Ward patent (U.S. Pat. No. 5,690,182) discloses a triangular-shaped frame for pivotal connection to the hitch members of a three-point hitch system mounted to the rear of a tractor. The frame includes a tube socket to which a hitch ball-type connection can be attached.

The Stelzle et al. patent (U.S. Pat. No. 6,134,494) discloses an automatic power takeoff control system for controlling the engagement of a power take-off shaft of a work vehicle having a hitch.

The Spears patent (U.S. Pat. No. 6,148,928) discloses a three-point hitch mounting system that includes hydraulically actuated draft arms for raising and lowering farm implements and a power take-off shaft for driving implements such as a mower.

The Spears patent (U.S. Pat. No. 6,481,948 B2) discloses a frame apparatus for disposition on the bed of a pickup truck and which accepts and operates implements such as off-the-shelf front-end loader assemblies.

However, despite the ingenuity of the above devices, there remains a need for a portable self-powered power take-off unit that can be easily transported and set up in several minutes at the rear of a pickup truck and is also adaptable as a stand-alone power take-off unit.

SUMMARY OF THE INVENTION

The present invention comprehends a portable power take-off unit for providing power to a range of low power, PTO-driven construction and farm equipment, implements and machinery such as forage (chopper) boxes, wagons, hay rakes, mowers, tillers, harrows, power boxes, etc.

The portable power take-off unit is a fully self-contained power unit that can be mounted to the rear of a vehicle, such as a pickup truck, for powering construction and farm machinery; or the portable power take-off unit can operate as a stand-alone, stationary unit for providing power to such construction and farm machinery.

The portable power take-off unit includes a framework that comprises a platform for disposition on the bed of the pickup truck and a crosspiece that extends transverse to the pickup truck bed; at the opposed ends of the crosspiece are downwardly projecting truck stakes that are inserted into the pockets located at the rear of the pickup truck sidewalls for securing the portable power take-off unit to the pickup truck. Supported on the platform of the power take-off unit is an engine that drives both a belt and pulley assembly and the hydraulic pump that is part of a hydraulic assembly. The hydraulic assembly also includes a hydraulic fluid reservoir, hydraulic hoses, hydraulic couplers, a hydraulic valve and control levers. Hydraulic hoses can be interconnected from the couplers to the hydraulic assembly of hydraulically powered or operated machinery and equipment for operating such machinery. A power take-off shaft is located adjacent the edge of the platform and is selectively driven by a chain-and-sprocket assembly at either a high speed or a low speed. The belt and pulley assembly includes a main drive shaft for driving the chain-and-sprocket assembly, which, in turn, drives the power take-off shaft. The power take-off shaft is splined to receive a one end of an elongated drive shaft, with the other end of the elongated drive shaft being connected to the particular piece of machinery for providing the power to operate that particular piece of machinery. A manually operable engagement lever is interconnected to an idler pulley that is part of the belt and pulley assembly, and releasing the engagement lever causes the idler pulley to tighten the belt of the belt and pulley assembly. This action results in the engagement of the chain-and-sprocket assembly and, in turn, the engagement of the power take-off shaft.

It is an objective of the present invention to provide a portable power take-off unit that operates from its own power source as a self-contained power unit instead of requiring as its power source the engine or transmission of a vehicle.

It is another objective of the present invention to provide a portable power take-off unit that is operable as a stand-alone stationary unit in addition to having the capability of being mounted at the rear of any automotive vehicle such as a pickup truck.

It is yet another objective of the present invention to provide a portable power take-off unit that can be installed on or removed from the vehicle in several minutes.

It is still yet another objective of the present invention to provide a portable power take-off unit that does not need bolting or drilling to install and secure the power take-off unit to the rear of the vehicle, such as the pickup truck.

It is yet a further objective of the present invention to provide a portable power take-off unit that doesn't require mounting brackets for mounting to the pickup truck and can be slid into the stake pockets on the pickup truck sidewalls for easy and quick securement thereto.

Still another objective of the present invention is to provide a portable power take-off unit that can operate a range of low power PTO driven construction and farm equipment and machinery such as wagons, forage (chopper) boxes, power boxes, wood splitters and hay rakes.

Still yet another objective of the present invention is to provide a portable power take-off unit that expedites the pulling and unloading of a piece of equipment, such as a wagon from the field by allowing the wagon to remain attached to the vehicle with the portable power take-off unit mounted to the rear of the vehicle for unloading the wagon.

A still further objective of the present invention is to provide a portable power take-off unit that saves time and labor by avoiding the need to haul the farm equipment, such as a wagon or forage box, from the field with a truck and then unhook the farm equipment from the truck and hook the farm equipment to a tractor for unloading because the power take-off unit will be mounted to the truck and used for unloading the contents of the wagon or forage box.

These and other objects, features and advantages will become apparent to one skilled in the art upon a perusal of the following detailed description read in conjunction with the accompanying drawing figures.

DETAILED DESCRIPTION OF THE PREFERRED EMBODIMENT

Illustrated in FIGS. 1-9 is a portable power take-off unit 10 for supplying power to, and operating, a range of low power PTO driven construction and farm machinery and equipment. Such machinery and equipment can include elevators, forage (chopper) boxes, wagons, hay rakes, mowers, tillers, harrows, discs, wood splitters, and power boxes, etc. A significant advantage of the portable power take-off unit 10 of the present invention is that it operates completely from its own power source, and therefore doesn't need to be powered from the engine or transmission of the vehicle on which it is mounted. Moreover, the portable power take-off unit 10 is adapted to fit onto any truck or truck-type vehicle, and it can also be used as a self-powered and stand-alone stationary unit. Thus, the portable power take-off unit 10 is a portable unit for providing mechanical power to non-powered construction and farm machinery and equipment, especially for machinery and equipment located in the field or job site that is remote from a power source—either electrical or mechanical.

Figure 1:
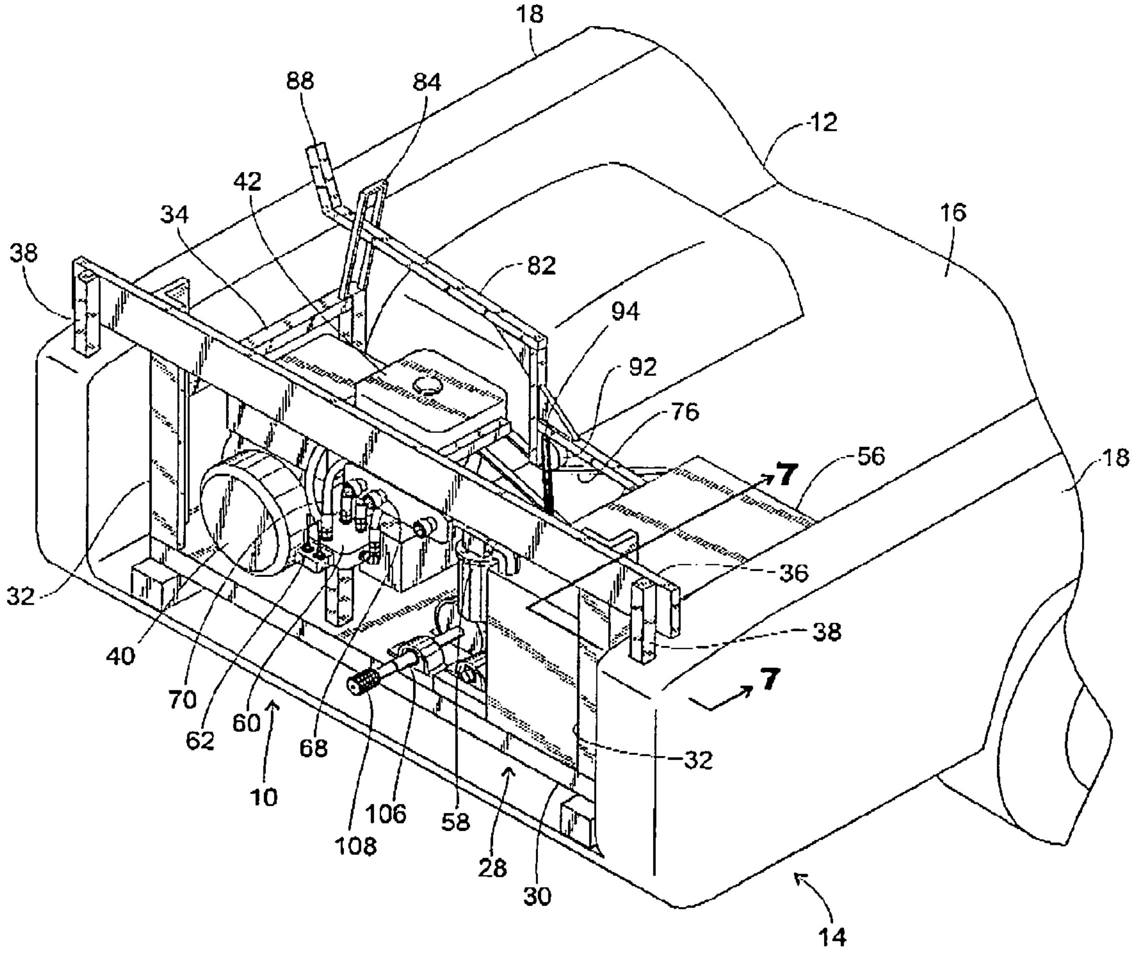
FIG. 1 is a perspective view of the portable power take-off unit of the present invention illustrating the mounting of the power take-off unit at the rear of a pickup truck and upon the bed of the pickup truck.
Figure 3:
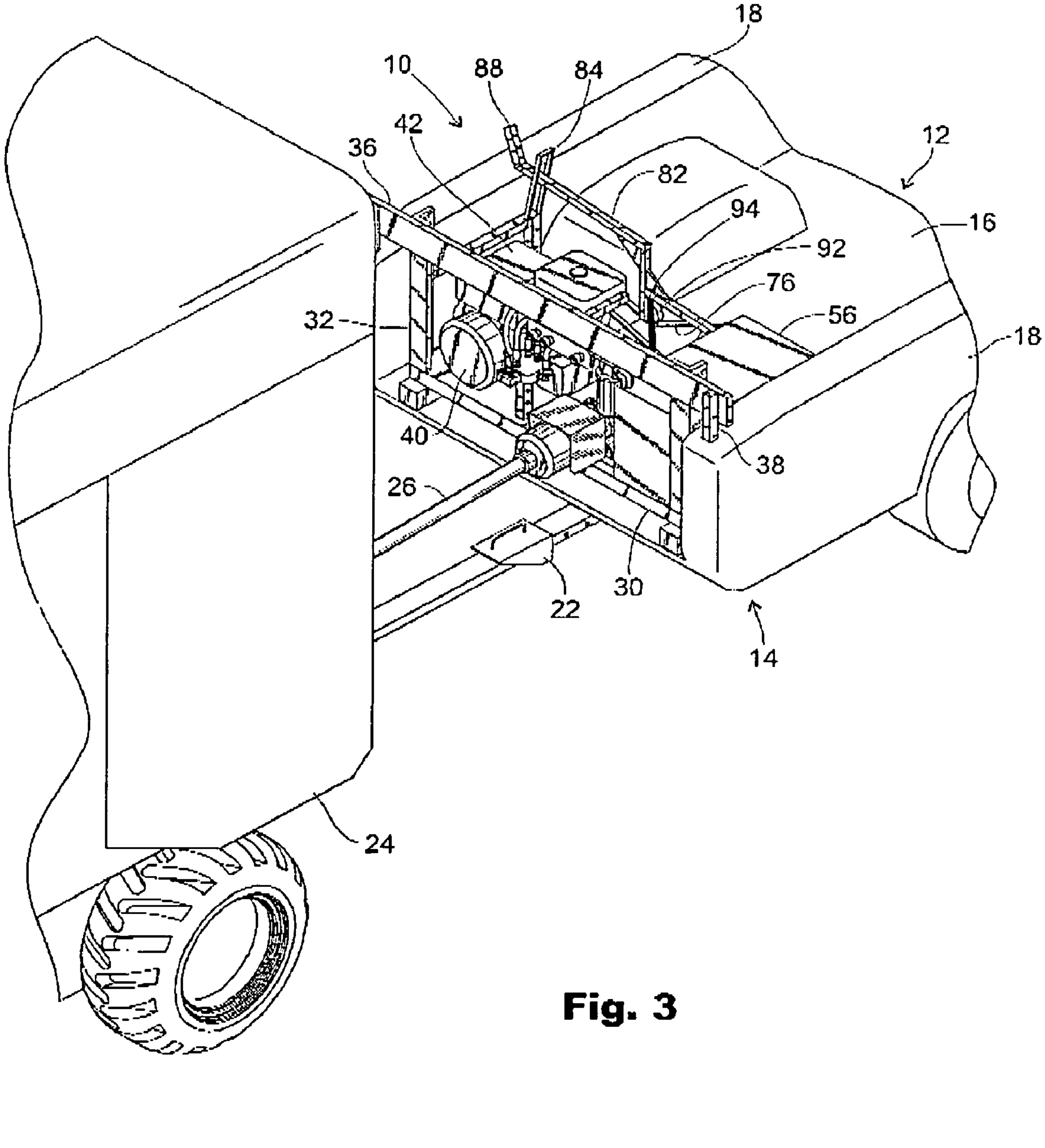
FIG. 3 is a perspective view of the portable power take-off unit of the present invention illustrating the securement of the power take-off unit at the rear of the pickup truck and the connection of an elongated drive shaft to the farm implement that is attached to and towed behind the pickup truck.

Thus, as shown in FIGS. 1 and 3, the portable power take-off unit 10 is shown mounted to a pickup truck 12—a standard vehicle on farms and construction sites. The pickup truck 12 includes a rear end 14 that defines a pickup truck bed 16 for supporting thereon the power take-off unit 10. The pickup truck 12 includes a pair of sidewalls 18 that enclose the bed 16, and at the rear of each sidewall 18 is at least one frame pocket 20 for receiving stakes, posts, stanchions, etc. In addition, the pickup truck 12 will usually include a truck hitch 22 that extends rearward of the truck bed 16. By way of example, a forage (chopper) box 24 is shown connected to the hitch 22 of the pickup truck 12, and the forage box 24 includes a power take-off shaft 26 that is drivingly connected to the portable power-take unit 10 for operating the forage box 24 as will be hereinafter further described.

As shown in FIGS. 1-5 the portable power take-off unit 10 includes a framework 28 sized to fit within the bed 16 of the pickup truck 12. The framework 28 includes a base or platform 30 for supporting thereon the various mechanical elements that comprise the power take-off unit 10. At least two frame stanchions 32 are mounted at one short side of the platform 30 with one frame stanchion 32 mounted to the opposite short side of the platform 30. A horizontal support member 34 adjoins the two frame stanchions 32 located on the same short side of the platform 30. A main crosspiece 36 is secured to the upper ends of the stanchions 32, and extends parallel to the platform 30 but is slightly longer than and extends past the platform 30 at both short sides. Attached to each opposed end of the main crosspiece 36 is a frame stake 38, and each frame stake 38 is sized to snugly fit within each respective sidewall pocket 20. Thus, the power take-off unit 10 can be easily and quickly mounted within the bed 16 for securement to the pickup truck 12 by lifting up the power take-off unit 10 so that it clears the bed 16 and then aligning and sliding the frame stakes 38 within the sidewall pockets 20 so that the platform 30 is lowered down and rests upon the bed 16 of the pickup truck 12.

Figure 4:
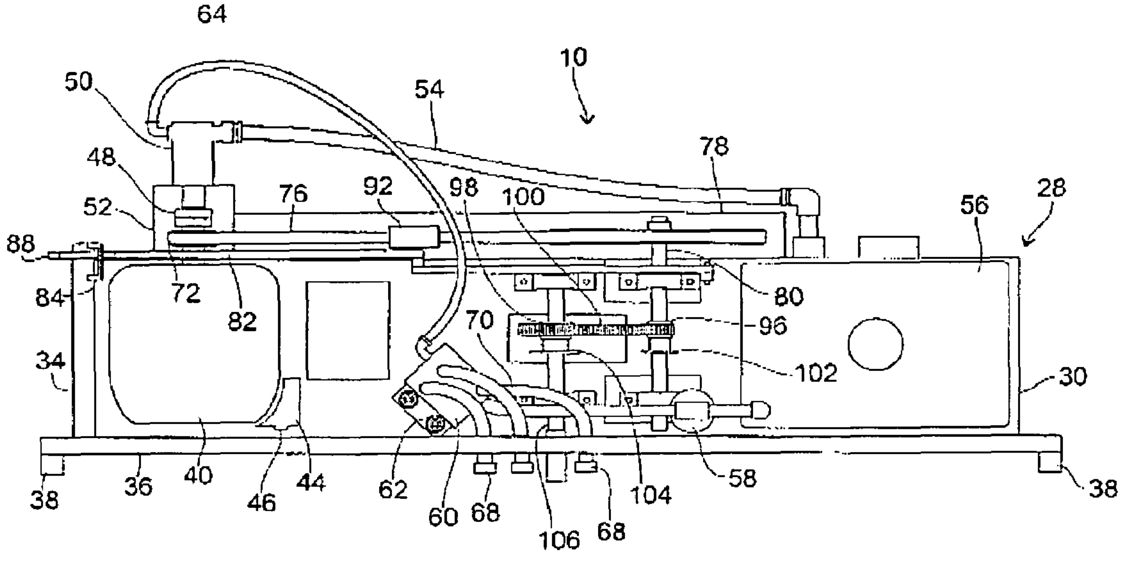
FIG. 4 is a top plan view of the portable power take-off unit of the present invention illustrating the location of the various hydraulic lines and hydraulic couplings.
Figure 5:
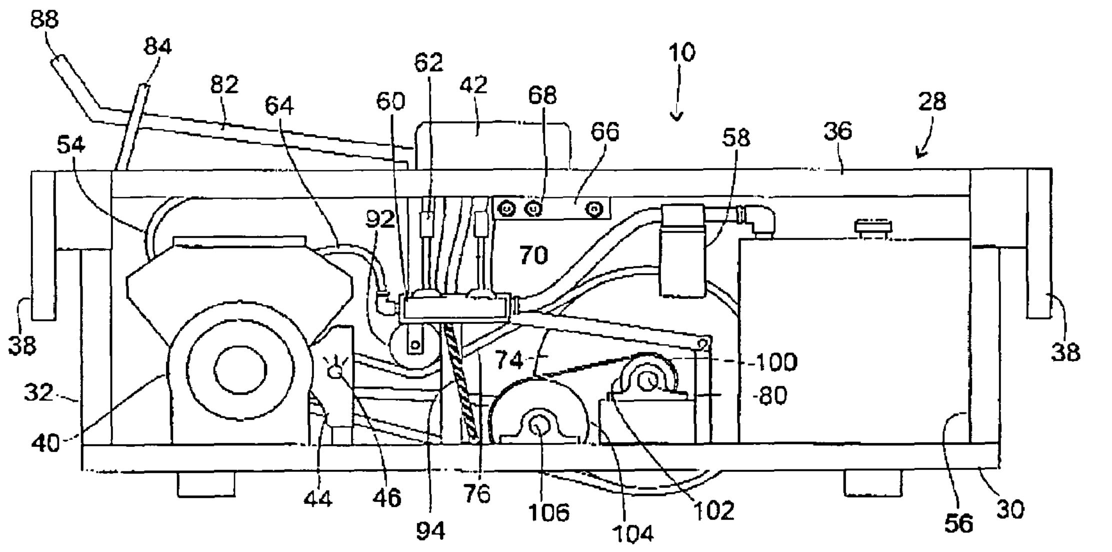
FIG. 5 is a front elevational view of the portable power take-off unit of the present invention illustrating the location of the engine, drive belt, chain and sprocket assembly and power take-off shaft.
Figure 6:
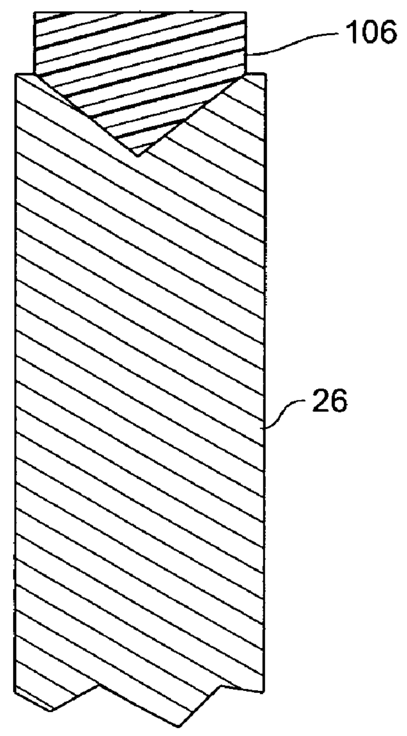
FIG. 6 is a sectioned view of the portable power take-off unit of the present invention illustrating the interconnection of the power take-off shaft with the elongated drive shaft for providing mechanical power to the implement.
Figure 7:
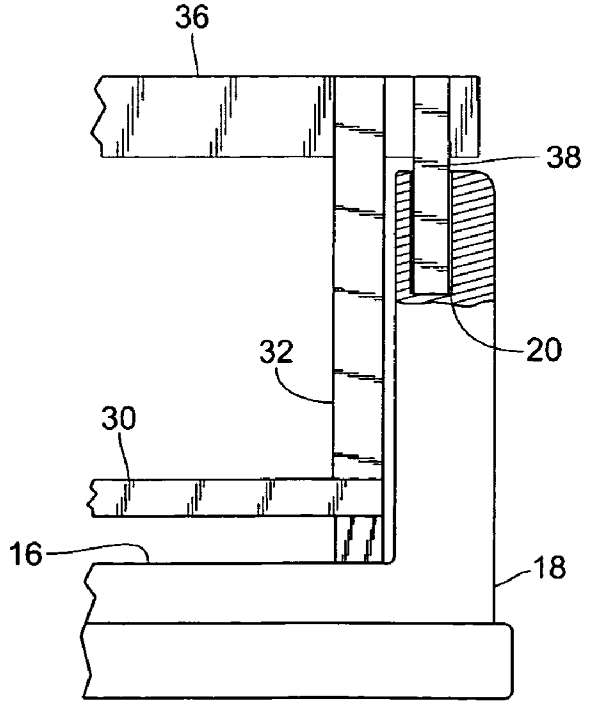
FIG. 7 is a sectioned elevational view of the portable power take-off shaft of the present invention illustrating the insertion of a truck stake into the pocket of the sidewall of the pickup truck for securing the power take-off unit to the rear of the pickup truck.
Figure 8:
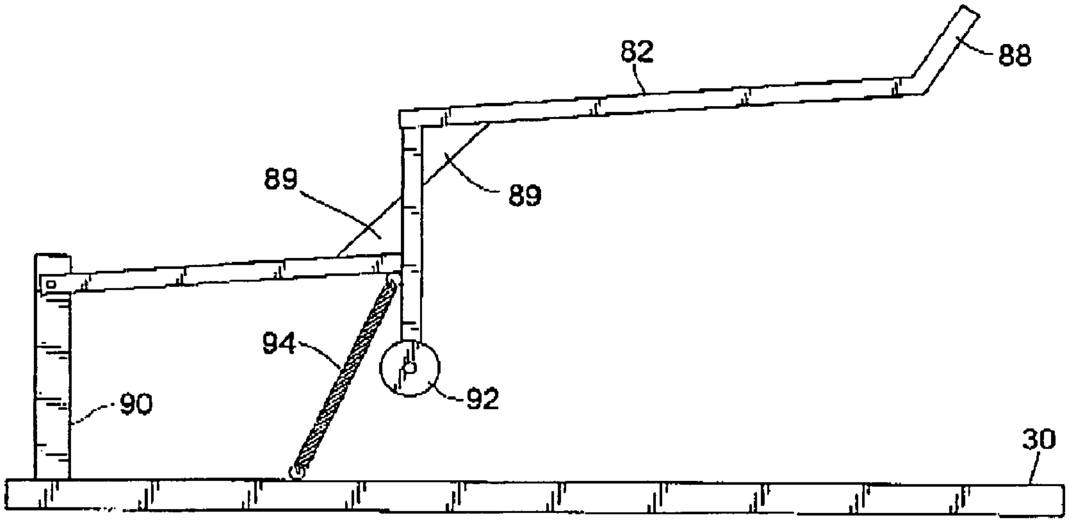
FIG. 8 is an elevational view of the portable power take-off shaft of the present invention illustrating the pivotal attachment and motion of the engagement lever for slackening and tightening the idler pulley.

The portable power take-off unit 10 includes it own power source means, and in the preferred embodiment the power source is preferably a gasoline engine 40 of between five and eight horsepower. A gasoline tank 42 is mounted adjacent the main crosspiece 36 and is in fluid communication with gasoline engine 40. As shown in FIGS. 4 and 5, the engine 40 is operated from a panel 44 that includes a manually operable switch 46 having the following engine settings or positions: on, off and start. The engine 40 drives an output or main drive shaft 48, and the main drive shaft 48 is interconnected to and engagable with several assemblies or systems, among them a hydraulic assembly, a belt and pulley assembly, and a chain and sprocket assembly.

With reference to FIGS. 1-5, the hydraulic assembly will be first described. A hydraulic pump 50 is interconnected to and driven by the output shaft 48. The hydraulic pump 50 is supported on the platform 30 by a mounting bracket 52. The hydraulic pump 50 is in fluid communication through a main hydraulic hose line 54 with a hydraulic reservoir 56 mounted on the platform 30. A hydraulic filter 58 is connected to the hydraulic reservoir 56, and the hydraulic reservoir 56 is in fluid communication with a hydraulic valve 60 manually operable through two hydraulic fluid control levers 62. Hydraulic hoses 64 also run from the hydraulic pump 50 to the hydraulic valve 60. A hose-coupler bracket 66 is mounted to the main crosspiece 36 adjacent and above the hydraulic valve 60 and the fluid control levers 62 for supporting thereon at least three hydraulic couplers 68. Each hydraulic coupler 68 is connected to the hydraulic valve 60 by a short hose line 70. The hydraulic assembly is used to power such machinery and equipment as hydraulic dump wagons and trailers, discs that require raising and lowering for transport, and the blades and cutters of wood splitters. Thus, hydraulic hoses (not shown) are connected to the appropriate hydraulic coupler 68 so that the portable power take-off unit's 10 hydraulic assembly can provide the hydraulic power for operating and controlling the particular piece of machinery that is connected by the hydraulic assembly to the power take-off unit 10.

As illustrated in FIGS. 1-9, the power take-off unit 10 also includes a belt and pulley assembly. The belt and pulley assembly is interconnected to and driven by the output shaft 48 of the engine 40, and, in turn, is drivingly interconnected to other structural elements hereinafter further described. A main drive pulley 72 is mounted on the output shaft 48 for rotation thereon, and the main drive pulley 72 is rotatably connected to a larger driven pulley 74 by an endless belt 76. The main drive pulley 72, larger driven pulley 74 and the endless belt 76 essentially function as part of a gear reduction unit for the gasoline engine 40. A guard 78 protects the main drive pulley 72, the driven pulley 74 and the endless belt 76, and separates the aforementioned elements from the hydraulic valve 60, the hydraulic control levers 62 and the engine 40. The driven pulley 74 is journaled on a sprocket main drive shaft 80 that extends through and is supported on the guard 78. The endless belt 76 has two operator selectable dispositions: a slack or loose disposition—the disengaged state; and a tightened disposition—the engaged state. When the endless belt 76 is in the disengaged state, the power take-off unit 10 cannot provide power to the piece of machinery; when the endless belt 76 is in the engaged state, the power take-off unit 10 can provide power to the piece of machinery.

Figure 2:
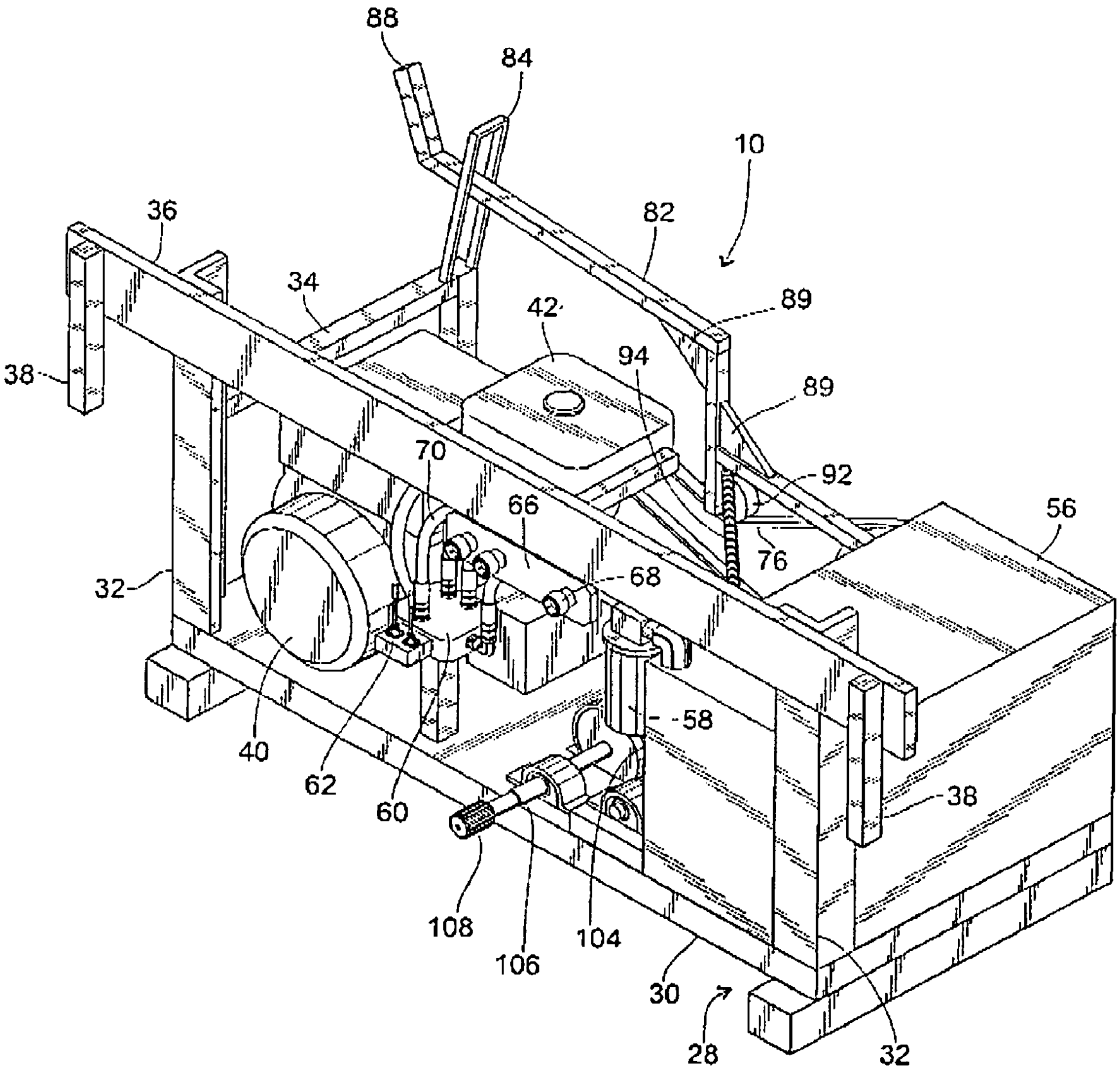
FIG. 2 is a perspective view of the portable power take-off unit of the present invention illustrating the portable power take-off unit dismounted from the pickup truck and operable as a freestanding stationary unit.
Figure 9:
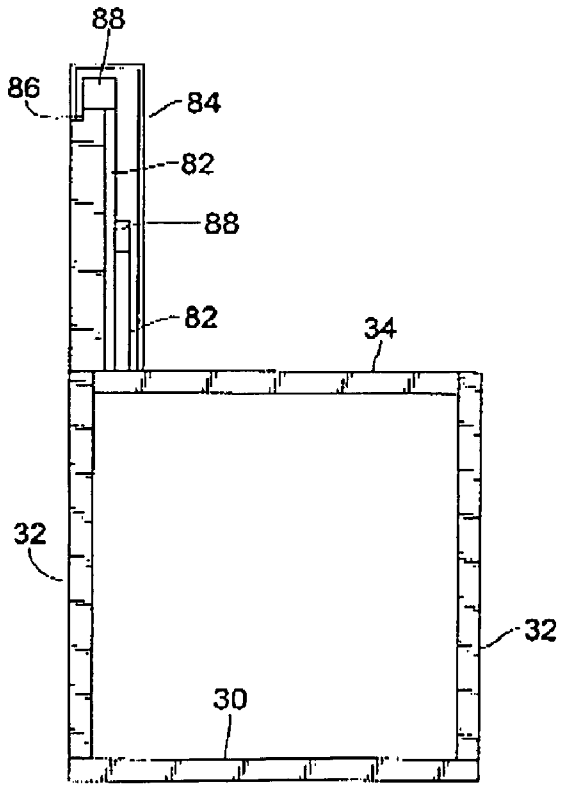
FIG. 9 is a rear elevational view of the portable power take-off shaft of the present invention illustrating the disposition of the engagement lever for tightening the idler pulley.
Figure 10:
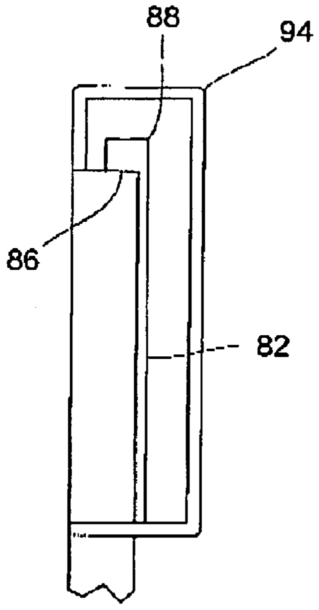
FIG. 10 is a side elevational view of the portable power take-off shaft of the present invention illustrating the engagement lever in the release disposition.

Thus, as shown most distinctly in FIGS. 1-3, 8 and 9, the power take-off unit 10 includes a means to selectively engage and disengage the belt and pulley assembly. Specifically, the power take-off engagement and disengagement means includes a generally I-shaped manually operable engagement lever 82. Mounted to the horizontal member 34, and upwardly extending therefrom, is a rectangular-shaped containment member 84. The containment member 84 is wider at one interior side to provide a handle rest 86 for the handle 88 of the engagement lever 82. The containment member 84 delimits the upward and downward movement of the engagement lever 82 thereby determining, in part, the extent of the pivotal movement of the engagement lever 82. In addition, the engagement lever 82 includes a pair of triangular plate reinforcements 89 that reinforce the engagement lever 82 during the upward and downward movement of the lever 82. An engagement lever support post 90 extends upwardly from the platform 30 opposite from the position of the handle 88 of the engagement lever 82; and the lowermost end of the engagement lever 82 is pivotally mounted to the engagement lever support post 90. The engagement lever 82 thus pivots on the support post 90 for raising and lowering. Rotatably mounted at the lower end of the middle portion of the engagement lever 82 is an idler pulley 92. The idler pulley 92 is in contact with the endless belt 76 and is selectively raised and lowered by raising and lowering the engagement lever 82 for tightening the belt 76 to engage the power take-off unit 10 or for slackening (reducing the tension on) the endless belt 76 for disengaging the power take-off unit 10. A tension spring 94 has opposed spring ends attached to the platform 30 and the middle portion of the engagement lever 82 immediately above the idler pulley 92. In order to tighten the endless belt 76 for engaging the power take-off unit 10, the handle 88 of the lever 82 is lifted off the handle rest 86 so that the lever 82 can be released and lowered within the containment member 84. The tension spring 94 assists in pivoting and downwardly pulling the engagement lever 82 so that the idler pulley 92 can be tightened upon the endless belt 76. FIGS. 1-3 illustrate the position of the engagement lever 82 and the idler pulley 92 when the engagement lever 82 is released so that the slack on the endless belt 76 is taken up by the downward movement of the idler pulley 76 resulting in the engagement of the power take-off unit 10. In order to slacken the contact of the idler pulley 92 on the endless belt 76, and thereby disengaging the power take-off unit 10, the engagement lever 82 is pivotally raised within the containment member 84 so that the handle 88 can be returned to the handle rest 86 thereby locking the engagement lever 82 in the disengaged state. Raising the engagement lever 82 simultaneously loosens or relaxes the contact of the idler pulley 92 on the endless belt 76 thereby causing the disengagement of the belt and pulley assembly and the power take-off unit 10. FIG. 9 shows the position of the handle 88 when the handle 88 sits on the handle rest 86 and the engagement lever 82 is disposed to the disengaged position; and the position of the handle 88 after the handle 88 has been lifted off handle rest 86 releasing the engagement lever 82 so that the idler pulley 92 is concomitantly tightened on and takes up the slack of the endless belt 76 thereby resulting in the engagement of the belt and pulley assembly and the power take-off unit 10.

As shown in FIGS. 4 and 5, the power take-off unit 10 includes the chain and sprocket assembly that is driven by the belt and pulley assembly. The chain and sprocket assembly is adapted for both a low speed operation and a high-speed operation. Thus, for low speed operation there is included a low speed driving sprocket 96 drivingly connected to a low speed driven sprocket 98 by a linked chain 100. The low speed driving sprocket 96 is mounted on the sprocket main drive shaft 80. In addition, for high speed operation there is included a high speed driving sprocket 102 drivingly connected to a high speed driven sprocket 104 by the same linked chain 100. The linked chain 100 can be manually moved back and forth between the low speed sprockets 96 and 98 and the high speed sprockets 102 and 104 depending on the type of machinery to which the power take-off unit 10 will be attached. It should be noted that both the high-speed sprocket pairs 102 and 104 and the low speed sprocket pairs 96 and 98 rotate simultaneously irrespective of which pair of sprockets the linked chain 100 is mounted on. The high speed driving sprocket 102 is also rotatably mounted on the sprocket main drive shaft 80.

As shown in FIGS. 1-6, a power take-off shaft 106 is journaled on both the low speed driven sprocket 98 and the high speed driven sprocket 104 and rotates concomitant with the rotation of both the low speed and the high-speed sprocket pairs 96 and 98 and 102 and 104. The power take-off shaft 106 includes a splined connection end 108 that slightly projects past the edge of the platform 30, and the connection end 108 preferably includes six splines with the power take-off shaft 106 itself operating at a standard 540 rpms. As shown in FIG. 3, the splined connection end 108 of the power take-off shaft 106 is attached to the splined end of the farm machinery's power take-off shaft for making the mechanical connection therebetween.

In operation, the power take-off unit 10 would be mounted onto the bed 16 of the pickup truck 12 and secured thereto by inserting the truck stakes 38 into the pockets 20 of the pickup truck sidewalls 18. The machinery's power take-off shaft, such as the power take-off shaft 26 for the forage box 24 shown in FIG. 3, is connected to the splined end 108 of the power take-off shaft 106 thereby making the mechanical interconnection. With the linked chain 100 already disposed on either the low speed sprocket pair 96 and 98 or the high speed sprocket pair 102 and 104, the engine 40 would be turned on and the handle 88 of the engagement lever 82 would be lifted off the rest 86 thereby releasing and lowering the engagement lever 82 and causing the idler pulley 92 to tighten the endless belt 76 as shown in FIGS. 1-3. This action will engage and appropriately cause the driving of the sprocket main drive shaft 80, which in turn transmits rotatable motion through the selected sprocket pair 96 and 98 or 102 and 104 for rotating the power take-off shaft 106. The mechanical energy from the rotational motion of the power take-off shaft 106 is transmitted through the forage box's 24 power take-off shaft 26 thereby providing the mechanical power to operate the forage box 24. To disengage the power take-off unit 10, the individual simply raises the engagement lever 82 and places the handle 88 back on the rest 86 of the containment member 84. This action simultaneously raises the idler pulley 92 and results in the loosening or slackening of the contact of the idler pulley 92 against the endless belt 76; which, in turn, causes the disengagement of the power take-off shaft 106 and a halt to the operation of the farm machinery such as the forage box 24 shown in FIG. 3.

I claim:

1. A portable power take-off unit removably mountable to the rear of a pickup truck for providing power to construction and farm equipment and machinery, comprising:

a framework for disposition on the bed of the pickup truck;

the framework including a pair of space-stakes that are securable to the respective sidewalls of the pickup truck;

a power take-off shaft capable of selective operation at a high speed and a low speed;

a sprocket and chain assembly interconnected to the power take-off shaft for driving the power take-off shaft at either the high speed or the low speed;

a belt and pulley assembly interconnected to the sprocket and chain assembly for driving the sprocket and chain assembly;

means for supplying power to the belt and pulley assembly for selectively driving the belt and pulley assembly;

an idler pulley for selective tightening of the belt and pulley assembly whereupon tightening the belt and pulley assembly engages the power take-off shaft and for selective disengagement from the belt and pulley assembly thereby resulting in the disengagement of the power take-off shaft; and a manually operable engagement lever connected to the idler pulley so that raising the engagement lever disengages the idler pulley from the belt and pulley assembly thereby disengaging the power take-off shaft and releasing the engagement lever causes the idler pulley to tighten the belt and pulley assembly thereby resulting in the engagement and operation of the power take-off shaft.

2. The portable power take-off unit of claim 1 wherein the means to supply power includes a gasoline engine of between five and eight horsepower.

3. The portable power take-off unit of claim 2 wherein the gasoline engine includes a main drive shaft.

4. The portable power take-off unit of claim 3 wherein the belt and pulley assembly includes a main drive pulley mounted on the main drive shaft for selective rotation thereon.

5. The portable power take-off unit of claim 4 wherein the belt and pulley assembly includes a driven pulley interconnected to the main drive pulley and rotatable concomitant therewith for driving the chain and sprocket assembly.

6. The portable power take-off unit of claim 5 wherein the belt and pulley assembly includes a drive belt mounted on the main drive pulley and the driven pulley for transmitting rotatable motion from the main drive pulley to the driven pulley.

7. The portable power take-off unit of claim 6 further comprising a sprocket drive shaft drivingly interconnected between the driven pulley and the chain and sprocket assembly for transferring rotational motion from the driven pulley to the chain and sprocket assembly.

8. The portable power take-off unit of claim 7 wherein releasing the engagement lever causes the idler pulley to tighten the drive belt thereby causing the engagement of the power take-off shaft and raising the engagement lever slackens the contact of the idler pulley with the drive belt thereby resulting in the disengagement of the power take-off shaft.

9. A portable power take-off unit removably mountable to the rear of a pickup truck for powering construction and farm equipment and machinery, comprising:

a framework for disposition within the bed of the pickup truck and adjacent the rear of pickup truck;

the framework including a pair of truck stakes with each truck stake insertable into the respective sidewall pocket of the pickup truck;

a power take-off shaft capable of operating at a high speed and a low speed for providing power to equipment and machinery;

a sprocket and chain assembly interconnected to the power take-off shaft for driving the power take-off shaft at either the high speed or the low speed;

a belt and pulley assembly interconnected to the sprocket and chain assembly for driving the sprocket and chain assembly;

means for supplying power to the belt and pulley assembly for selectively driving the belt and pulley assembly;

an idler pulley capable of selectively tightening the belt and pulley assembly so that the power take-off shaft can be engaged and for selectively disengaging from the belt and pulley assembly thereby resulting in the disengagement of the power take-off shaft; and a manually operable engagement lever attached to the idler pulley so that raising the engagement lever disengages the idler pulley from the belt and pulley assembly and results in the disengagement of the power take-off shaft and releasing the engagement lever causes the idler pulley to tighten the belt and pulley assembly thus allowing for the engagement and operation of the power take-off shaft for providing power to the equipment and machinery.

10. The portable power take-off unit of claim 9 wherein the means to supply power includes a gasoline engine.

11. The portable power take-off unit of claim 10 further comprising a hydraulic pump that is powered by the gasoline engine.

12. The portable power take-off unit of claim 11 further comprising a hydraulic fluid and that is in flow communication with the hydraulic pump so that the hydraulic fluid can be pressurized by the operation of the hydraulic pump.

13. The portable power take-off unit of claim 12 further comprising a hydraulic valve for regulating and directing the flow of hydraulic fluid.

14. The portable power take-off unit of claim 13 further comprising a plurality of hydraulic hoses for the hydraulic pump, the hydraulic fluid reservoir and the hydraulic valve and for directing the flow of hydraulic fluid therethrough.

15. The portable power take-off unit of claim 14 further comprising a plurality of hydraulic couplers interconnected to the hydraulic valve with each coupler having one of the plurality of hydraulic hoses attached thereto so that hydraulic fluid can be directed from the hydraulic valve and through the couplers and associated hydraulic hoses and to the equipment and machinery so that the equipment and machinery can be controlled and operated.

16. A portable power take-off unit for providing power to construction and farm machinery and equipment, comprising:

a framework for disposition on the ground surface adjacent the machinery and equipment, a power take-off shaft capable of selective operation at a high speed and a low speed for powering the machinery and equipment;

a sprocket and chain assembly interconnected to the power take-off shaft for driving the power take-off shaft at either the high speed or low speed;

a belt and pulley assembly interconnected to the sprocket and chain assembly for driving the sprocket and chain assembly;

means for supplying power to the belt and pulley assembly for selectively driving the belt and pulley assembly;

an idler pulley for selective tightening of the belt and pulley assembly whereupon tightening the belt and pulley assembly engages the power take-off shaft and for selective disengagement from the belt and pulley assembly thus resulting in the disengagement of the power take-off shaft; and a manually operable engagement lever attached to the idler pulley so that raising the engagement lever disengages the idler pulley from the belt and pulley assembly thereby disengaging the power take-off shaft and releasing the engagement lever causes the idler pulley to tighten the belt and pulley assembly thereby resulting in the engagement of the power take-off shaft.

17. The portable power take-off unit of claim 16 wherein the means to supply power includes a gasoline engine rated between five and eight horsepower.

18. The portable power take-off unit of claim 17 wherein the gasoline engine includes a main drive shaft.

19. The portable power take-off unit of claim 18 wherein the belt and pulley assembly includes a main drive pulley mounted on the main drive shaft for selective rotation therewith.

20. The portable power take-off unit of claim 19 wherein the belt and pulley assembly includes a driven pulley interconnected to the main drive pulley and rotatable concomitant with the rotation of the main drive pulley for driving the chain and sprocket assembly.

21. The portable power take-off unit of claim 20 wherein the belt pulley assembly includes a drive belt extending around the main drive pulley and the driven pulley for transmitting rotatable motion from the main drive pulley to the driven pulley.

22. The portable power take-off unit of claim 21 further comprising a sprocket drive shaft drivingly interconnected between the driven pulley and the chain and sprocket assembly for transferring rotational motion of the driven pulley to the chain and sprocket assembly so that the power take-off shaft can be engaged and provide power to the machinery and equipment.

23. The portable power take-off unit of claim 22 wherein releasing the engagement lever causes the idler pulley to tighten the drive belt thereby resulting in the engagement of the power take-off shaft and raising the engagement lever slackens the contact of the idler pulley with the drive belt thereby resulting in the disengagement of the power take-off shaft.

24. The portable power take-off unit of claim 18 further comprising a hydraulic pump that is powered by the gasoline engine.

25. The portable power take-off unit of claim 24 further comprising a hydraulic fluid reservoir containing hydraulic fluid and that is in flow communication with the hydraulic pump for enabling the pressurization of the hydraulic fluid by the operation of the hydraulic pump.

26. The portable power take-off unit of claim 25 further comprising a hydraulic valve in flow communication with the hydraulic pump and the hydraulic fluid reservoir for regulating and directing the flow of hydraulic fluid.

27. The portable power take-off unit of claim 26 further comprising a plurality of hydraulic hoses for interconnecting and providing hydraulic fluid flow communication with the hydraulic pump, the hydraulic fluid reservoir and the hydraulic valve.

* * * * *